July 22, 1952
H. E. HERMANN
2,604,558
ELECTRIC CIRCUIT MAKE AND BREAK DEVICE FOR DETECTING
UNBALANCE IN ROTATING BODIES
Filed Feb. 1, 1950
2 SHEETS—SHEET 2
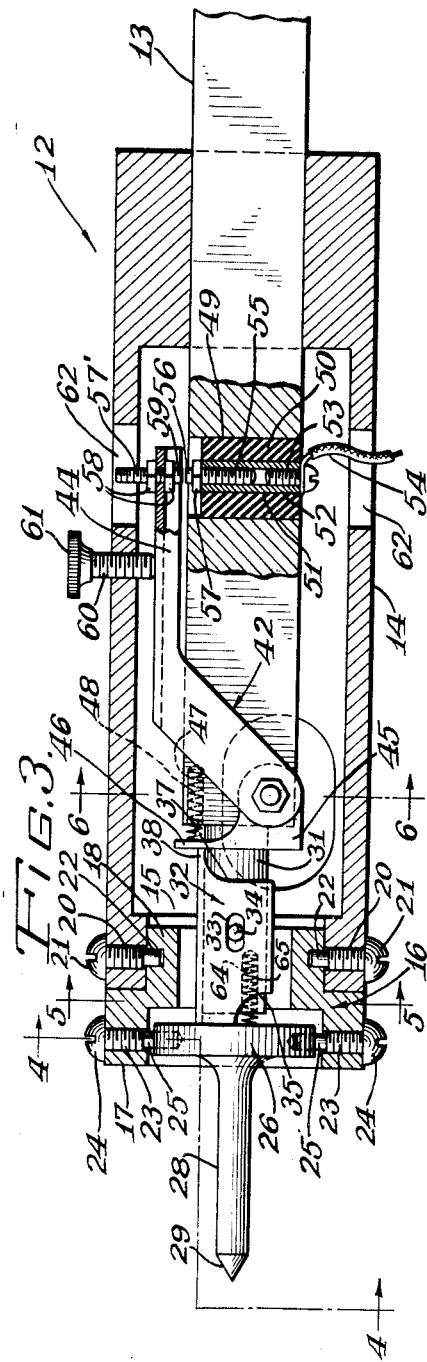
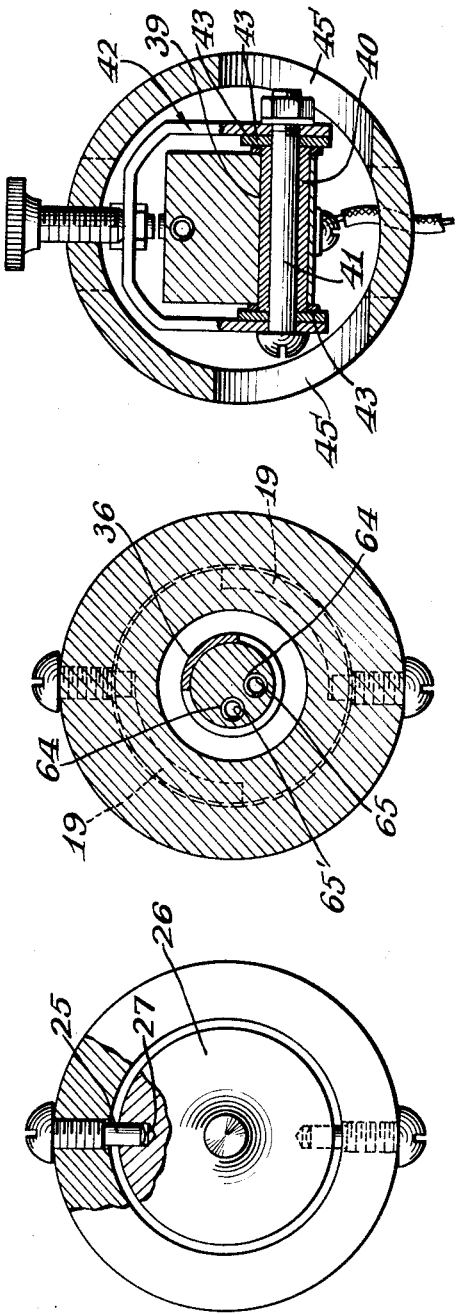
Inventor:
Henry E. Hermann
By Lee J. Gary
Atty.

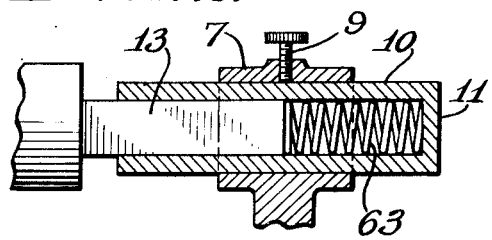
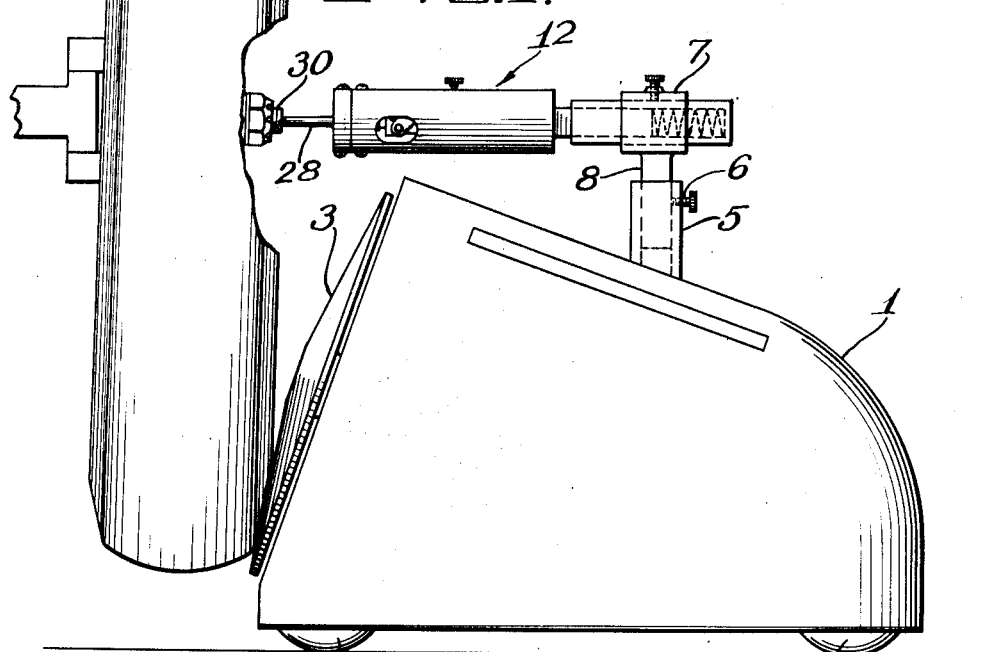
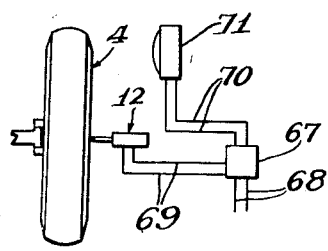

Patented July 22, 1952

2,604,558

UNITED STATES PATENT OFFICE 2,604,558

ELECTRIC CIRCUIT MAKE AND BREAK DEVICE FOR DETECTING UNBALANCE IN ROTATING BODIES

Henry E. Hermann, Moline, Ill., assignor to Bear Manufacturing Company, Rock Island, Ill., a corporation of Delaware Application February 1, 1950, Serial No. 141,783

6 Claims. (Cl. 200—52)

This invention relates to improvements in a feeler device for making and breaking an electrical circuit in response to vibrations imparted to a vibratable or oscillatable feeler pin, and refers particularly to a circuit make and break device which may be employed in detecting and locating the unbalanced portions of automobile wheels.

In some types of mechanism for detecting an unbalanced automobile wheel and for locating the position of the unbalanced portion of said wheel, a stroboscopic light is employed which renders quasi stationary a predetermined portion of the wheel. This stroboscopic action is accomplished by making or breaking an electric circuit containing the stroboscopic light in response to vibrations of the wheel when rotated, the detected vibrations occurring periodically by the cyclic passing of the unbalanced portion of the wheel. When the location of the unbalanced portion of the wheel is found, well known corrective measures can be made to balance the wheel.

The present invention is directed to the provision of a device which converts or transforms such vibrations into timed period electrical impulses, which, in turn, periodically energize a stroboscopic light.

One of the important features of the invention resides in a device of the character described which is simply constructed, is extremely rugged and can be conveniently used, the operation of the device being positive and reliable.

Other objects, advantages and features of my invention will be apparent from the accompanying drawings and following detailed description.

In the drawing, Fig. 1 is a front elevational view, parts being broken away, illustrating my improved device in operative position with respect to an automobile wheel.

Fig. 2 is a detailed sectional view illustrating the mounting means for the device.

Fig. 3 is a longitudinal sectional view of my improved device.

Fig. 4 is a transverse sectional view taken on line 4—4 of Fig. 3.

Fig. 5 is a transverse sectional view taken on line 5—5 of Fig. 3, and

Fig. 6 is a transverse sectional view taken on line 6—6 of Fig. 3.

Fig. 7 is a diagrammatic view illustrating the relationship of my device, an automobile wheel and a stroboscopic light.

Referring in detail to the drawing, 1 indicates a housing which may be conveniently mounted upon rollers or wheels 2 whereby the same may be conveniently moved into and out of operative position. The housing 1 contains an electric motor, the shaft of which is disposed exteriorly of the housing and carries a tapered disc 3, hereinafter referred to as a "spinner."

In utilizing my device the housing is disposed adjacent a wheel 4 of an automobile and in testing the wheel for unbalance the auto is jacked up until the lower portion of the wheel is clear of the supporting floor. The housing 1 is then moved toward the wheel until the spinner 3 makes contact with the side of the automobile tire. The motor is energized and in this fashion the wheel 4 is rotated. After the wheel has been rotated by the spinner, the housing is moved rearwardly from the wheel to disengage the frictional contact of the spinner with the tire, leaving the wheel free to rotate under its own momentum.

A tubular standard 5 is positioned upon the upper portion of the housing 1 and is provided with a set screw 6. A sleeve 7 carries a projecting stem 8 which fits telescopically into the interior of the tube 5, the set screw 6 permitting a fixed vertical adjustment of the sleeve 7. Sleeve 7 also carries a set screw 9 and a tubular member 10 closed at one end 11 is longitudinally movable within the sleeve 7, the tubular member being rendered stationary within the sleeve at any desired position by the proper manipulation of set screw 9. As will be hereinafter more fully described the tubular member 10 is adapted to function as a support for my improved make and break device indicated generally at 12.

The device 12 comprises a rectangular sectioned bar 13 which carries a tubular housing 14, the housing being rigidly mounted upon an intermediate portion of the bar 13 by shrinking or pressing the same thereon. The tubular housing 14 has an open end 15 in which a collar 16 is positioned. The collar 16 comprises a portion 17 of relatively enlarged diameter and an offset portion 18 of relatively restricted diameter, the latter portion being adapted for slidable engagement with the defining edge of the open mouth 15 of the tubular housing 14.

The restricted portion 18 of the collar 16 is provided with two arcuate slots 19 each of which extend approximately 90° around the circumference of the restricted portion 18, said slots being diametrically opposite each other. A pair of screws 20 having heads 21 are threadedly positioned in diametrically opposite portions of the mouth-defining end of the tubular housing 14. Each screw 20 terminates in a restricted end 22 which is engageable in each of the arcuate slots 19, the arrangement being such that the collar 16 may be rotated throughout an arc of substantially 90° with respect to the tubular housing 14, said collar being locked against axial movement by screws 20.

A pair of screws 23 are threadedly engaged in diametrically opposite portions of the enlarged end of collar 16, each of said screws being provided with slotted heads 24. The ends of each of said screws terminate in projections 25 of restricted diameter. A disc 26 is adapted for positioning within the end of the collar 16, said disc being provided with diametrically opposite openings 27 in which the projections 25 are adapted to be received, the arrangement being such that the projections 25 function as pivots for the disc 26. A pin 28 having a conically pointed portion 29 formed rigid, preferably integral, with disc 26, extends outwardly from substantially the central portion of the disc 26. The pin 28, in utilizing my invention, engages the axial center of shaft 30 (Fig. 1) upon which the automobile wheel 4 is mounted.

Bar 13 projects inwardly into the interior portion of housing 14. At the end of the rectangular portion of bar 13, said bar is formed with a projection 31 of circular section and of relatively restricted diameter relative to the bar 13. When the parts are assembled the end of the projection 31 terminates adjacent but spaced from the inner face of disc 26.

A sleeve 32 is loosely positioned upon the projection 31, said sleeve being provided with opposite slots 33 in which pins 34 carried on opposite diametrical portions of the projection engage, the arrangement being such sleeve 32 is prevented from rotating relative to the projection 31 but has a limited degree of freedom axially upon said projection. The forward portion of sleeve 32 is cut away as indicated at 35 providing an arcuate edge 36 (Fig. 5) which spans substantially 90° of arc and is adapted to make contact with the inner face of the disc 26. The rear portion of sleeve 32 is also cut away as indicated at 37 providing an extending end portion 38 which terminates substantially in a point.

Bar 13 at its forward end adjacent its juncture with projection 31 is provided with a transverse opening 39 in which a tubular sleeve 40 is positioned. A bolt 41 passes through sleeve 40 and is adapted to function as a pivot for yoke 42, washers 43 being employed to permit free swingable motion of the yoke 42 upon the bolt 41. The yoke 42 extends rearwardly and upwardly from bolt 41 and terminates in an arm 44 which is disposed parallel to the axis of the bar 13. Openings 45' are provided in the tubular housing 14 adjacent the pivotal connection of the yoke 42 and bar 13 whereby the parts may be conveniently assembled.

A second yoke 45 is also pivoted upon bolt 41 and terminates in an abutment member 46. The end of bar 13 is provided with a bore 47 in which coil spring 48 is positioned, said coil spring extending outwardly from the end of bar 13 and being in contact with the rear face of the abutment member 46 by means of spring 48 whereby the abutment member is maintained in resilient contact with the tip 38 of sleeve 32. The yokes 42 and 45 upon bolt 41 are frictionally engaged with each other whereby rocking movement imparted to the abutment 46 is transmitted to arm 44.

Bar 13 is provided with a transverse opening or bore 49 in which an insulating tubular member 50 is positioned. The insulating member 50 is provided also with a bore 51 in which a metallic tubular member 52 is positioned. The tubular member 52 is internally threaded and is adapted to receive screw 53 which functions as a binding post for conductor 54 which is connected thereto. At the opposite end of the tubular member 52 a screw 55 is threadedly positioned, said screw terminating in an electrical contact point 56, the screw carrying a flange 57 whereby the screw 55 may be locked within the tubular member 52. The end of arm 44 is provided with an opening adapted for the reception of a screw 57' which is adjustably secured upon the arm by means of nuts 58. Screw 57' terminates in a contact point 59 which is positioned adjacent contact point 56. A set screw 60 is threadedly positioned through the wall of housing 14, said set screw being provided with a knurled head 61. The set screw is normally in contact with arm 44 and functions to limit the distance which contact 59 moves away from contact 56. Housing 14 is provided with openings 62 whereby the parts comprising the electrical make and break mechanism hereinbefore described may be assembled.

In operating my device the wheel 4 of the automobile is raised by jacking the automobile up until the wheel is free of the floor. The housing 1 is moved toward the wheel until the spinner 3 is in contact with the side of the tire. Pin 28 is positioned at the axial center of shaft 30 and is urged toward said shaft by the compression of a spring 63 which is positioned within the tubular member 10 and confined between the closed end thereof and the end of bar 13. In adjusting the device when the spinner 3 is brought into contact with the side of the tire, coil spring 63 is brought under considerable compression so that when the housing 1 is subsequently backed away from the tire the wheel is permitted to spin freely, the pin 28 will still engage the end of shaft 30 under a desired degree of compression of spring 63. Of course, the degree of compression of spring 63 can be predetermined by the proper positioning of the tubular member 10 in sleeve 7.

Projection 31 is provided with a pair of bores 64 in which coil springs 65 and 65' are positioned, said coil springs extending outwardly from the end of projection 31 and bearing upon the inner surface of disc 26. As will be hereinafter more fully described, when collar 16 is in such position that disc 26 vibrates about a horizontal axis, the spring 65 primarily resists such vibration. When collar 16 is so rotated as to position disc 26 so that it vibrates about a vertical axis, spring 65' primarily resists such motion.

It has been found that in almost all instances when a wheel is unbalanced, it is unbalanced both statically and dynamically, and in most instances the static unbalance is productive of more vigorous vibration, when the wheel is rotated, than the dynamic unbalance. It will be noted from Fig. 1 that the spindle 30 and hence the wheel 4 is carried by the kingpin of the automobile steering assembly. Therefore, less resistance is offered to horizontal vibration than is offered to vertical vibration, that is, for a predetermined force causing vibration, that is, a predetermined unbalance of the wheel, the wheel will vibrate horizontally at right-angles to spindle 30 at a greater amplitude than it will vertically.

Static and dynamic unbalance of the wheel do not exhibit separate forces causing vibration but the vibration exhibited is caused by the resultant of these two components. The component of static unbalance, as mentioned hereinbefore is usually dominant and with my present device it can be effectively resolved and corrected and thereafter the dynamic component can be resolved and corrected.

To accomplish this resolution and correction, collar 16 is initially rotated so as to bring pivots 25 horizontal, that is, disc 26 is relatively free to oscillate about a horizontal axis. With the point 29 of pin 28 moving in timed relationship with the spindle 30 the disc 26 rocks relative to sleeve 32 only in response to vertical movement of the spindle. As has been hereinbefore described, the wheel resists vertical vibration to a greater degree than it does horizontal vibration. Hence, static unbalance, normally the most vigorous component contributes most to vertical vibration, and due to this characteristic, it may be effectively isolated or resolved and corrected, as hereinafter described.

Vibration of pin 28 and rocking of disc 26 imparts reciprocal motion to sleeve 32 which, in turn, rocks arm 44, making and breaking contact at points 56 and 59. By virtue of the position of pivot pins 25 initial separation of the contacts 56 and 59 occurs when the unbalanced portion of the wheel passes the lowermost vertical position of the wheel's travel, hence, as will be hereinafter described the stroboscopic light flashes. In this manner the position of resultant unbalance can be located on the wheel and corrective measures taken.

The corrective measures taken usually comprise the application of a weight or weights to the wheel. In view of the fact that the resultant unbalance usually is dominated by the static component, the static component is effectively compensated.

The collar 26 is then rotated so that pivots 25 are substantially vertical and the operation repeated. In view of the previous correction made, a new resultant of unbalanced forces now causes vibration. This resultant may be considered essentially made up of the dynamic component. The location of unbalance of the new resultant utilizing horizontal vibration to make or break the electric circuit to the stroboscopic light can then be obtained and further corrective measures can be made. For all practical purposes both components of unbalance can thus be corrected.

As has been hereinbefore described contact point 56 is insulated from the body of the device and contact point 59 is grounded thereon. Referring particularly to Fig. 7, 68 indicates a source of electric current which is connected to a conventional stroboscopic mechanism 67 by means of conductors 68. Conductors 69 connect the device 67 to the contact arrangement hereinbefore described, one of the conductors 69 connecting with the conductor 54 and the other conductor being grounded with the device 12. Conductors 70 connect the mechanism 67 to a conventional stroboscopic light 71.

As the wheel 4 rotates and imparts vibrational movement to the apparatus hereinbefore described contact points 56 and 59 are periodically brought into contact and periodically break contact in timed relationship to the wobble or vibration of wheel 4. If the wheel 4 is unbalanced this wobble or vibration occurs periodically and consequently the making and breaking of electrical contact to the mechanism 67 tends to complete and break the circuit to the stroboscopic light 71. The light 71 periodically flashes on and off and in view of the fact that said flashing is timed with the wobble of wheel 4 a point upon the surface of the wheel will be located which appears to be stationary. In view of the fact that disc 26 is pivoted about either a horizontal or vertical axis the feeler pin 28 will rock said disc when the unbalanced portion of the wheel crosses the vertical or horizontal axis of the wheel. Simultaneously, the electrical circuit is made or broken, and depending upon the phase relationship of the stroboscopic mechanism 67, the light will flash at either the upper vertical position or the lower vertical position of unbalance or at either extremity of the horizontal position. As the light periodically flashes, a point on the wheel will be identified as being quasi stationary. This point bears a fixed angular relationship with that portion of the wheel which is then passing the vertical or horizontal and consequently when the wheel is stopped, the noted point is placed in the position it had been observed under the flashes and the position of unbalance of the wheel can then be identified as being on the vertical or horizontal axis of the wheel in this datum position.

I claim as my invention:

1. A device for making and breaking an electrical circuit in response to periodic mechanical vibration comprising, a fixed support, a member slidably movable upon said fixed support, a feeler pivotally carried upon said fixed support for contact with a vibration producing body and pivotally movable in response to vibrations of said body, a rockable member carried by said fixed support, said slidable member being in resilient contact with said feeler device and rockable member to convert pivotal movement of said feeler to rockable movement of said rockable member, electrical contact means carried by said rockable member, cooperative contact means carried by said fixed support to make and break an electrical circuit in response to rockable movement of said rockable member.

2. A device for making and breaking an electrical circuit in response to periodic mechanical vibration comprising, a fixed support, a member slidably movable upon said fixed support, a feeler pivotally carried upon said fixed support for contact with a vibration producing body and pivotally movable in response to vibrations of said body, an abutment member rockably positioned on said fixed support, an arm rockably mounted on said fixed support in friction engagement with said abutment member whereby rocking movement of said abutment member imparts rocking movement to said arm, said slidable member being in resilient contact with said feeler device and abutment member to convert pivotal movement of said feeler to rockable movement of said abutment member, electrical contact means carried by said arm, cooperative contact means carried by said fixed support to make and break an electrical circuit in response to rockable movement of said arm.

3. A device for making and breaking an electrical circuit in response to periodic mechanical vibration comprising, a fixed support comprising a cylinder, a tubular member slidably movable upon said cylinder, a feeler pivotally carried upon said fixed support for contact with a vibration producing body and pivotally movable in response to vibrations of said body, a rockable member carried by said fixed support, said tubular member being in resilient contact with said feeler device and rockable member to convert pivotal movement of said feeler to rockable movement of said rockable member, electrical contact means carried by said rockable member, cooperative contact means carried by said fixed support to make and break an electrical circuit in response to rockable movement of said rockable member.

4. A device for making and breaking an electrical circuit in response to periodic mechanical vibration comprising, a fixed support, a member slidably movable upon said fixed support, a disc pivotally carried upon said fixed support, a feeler carried by said disc for contact with a vibration-producing body, said disc being pivotally movable in response to vibrations of said body, a rockable member carried by said fixed support, said slidable member being in resilient contact with said disc and rockable member to convert pivotal movement of said disc to rockable movement of said rockable member, electrical contact means carried by said rockable member, cooperative contact means carried by said fixed support to make and break an electrical circuit in response to rockable movement of said rockable member.

5. A device for making and breaking an electrical circuit in response to periodic mechanical vibration comprising, a housing open at one end and closed at the other, a fixed element carried within said housing, a member slidably movable upon said fixed element, a feeler pivotally carried upon said housing adjacent its open end for contact with a vibration-producing body and pivotally movable in response to vibrations of said body, a rockable member carried by said fixed element, said slidable member being in resilient contact with said feeler device and rockable member to convert pivotal movement of said feeler to rockable movement of said rockable member, electrical contact means carried by said rockable member, cooperative contact means carried by said fixed element to make and break an electrical circuit in response to rockable movement of said rockable member.

6. A device for making and breaking an electrical circuit in response to periodic mechanical vibration in a predetermined plane comprising, a fixed support, a member slidably movable upon said fixed support, a feeler pivotally mounted upon said fixed support for pivotal movement in a predetermined plane, said feeler being adapted to contact a vibration-producing body and be moved in said predetermined plane in response to vibrations of said body in said plane, said slidable member being in contact with said feeler whereby pivotal movement of said feeler produces reciprocating movement of said slidable member, means contacting said slidable member to make and break an electrical circuit in response to reciprocal movement of said slidable member, and means for adjusting said pivotally mounted feeler to change the plane of pivotal movement of said feeler.

HENRY E. HERMANN.

REFERENCES CITED

The following references are of record in the file of this patent:

UNITED STATES PATENTS

| Number | Name | Date |
|---|---|---|
| 2,341,444 | Hunter | Feb. 8, 1944 |
| 2,344,349 | Forster | Mar. 14, 1944 |
| 2,374,868 | Krieger | May 1, 1945 |
| 2,397,978 | Paulus et al. | Apr. 9, 1946 |